United States Patent
Ji et al.

(10) Patent No.: US 12,477,519 B2
(45) Date of Patent: Nov. 18, 2025

(54) INFORMATION TRANSMISSION METHOD AND TERMINAL DEVICE

(71) Applicant: VIVO MOBILE COMMUNICATION CO., LTD., Guangdong (CN)

(72) Inventors: Zichao Ji, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 620 days.

(21) Appl. No.: 17/894,290

(22) Filed: Aug. 24, 2022

(65) Prior Publication Data

US 2022/0408415 A1     Dec. 22, 2022

Related U.S. Application Data

(63) Continuation of application No. PCT/CN2021/083240, filed on Mar. 26, 2021.

(30) Foreign Application Priority Data

Mar. 27, 2020 (CN) .......................... 202010231316.7

(51) Int. Cl.
*H04W 72/02* (2009.01)
*H04W 72/0446* (2023.01)
*H04W 92/18* (2009.01)

(52) U.S. Cl.
CPC ....... *H04W 72/02* (2013.01); *H04W 72/0446* (2013.01); *H04W 92/18* (2013.01)

(58) Field of Classification Search
None
See application file for complete search history.

(56) References Cited

U.S. PATENT DOCUMENTS

| | | |
|---|---|---|
| 2018/0324882 A1 | 11/2018 | Gulati et al. |
| 2018/0376525 A1 | 12/2018 | Feng |
| 2019/0373617 A1* | 12/2019 | Sun ................ H04W 88/02 |
| 2020/0305139 A1* | 9/2020 | Xu ................ H04W 72/23 |
| 2021/0028913 A1 | 1/2021 | Peng |
| 2021/0037534 A1 | 2/2021 | Ji |
| 2021/0058215 A1 | 2/2021 | Si et al. |

(Continued)

FOREIGN PATENT DOCUMENTS

| | | |
|---|---|---|
| CN | 110380828 A | 10/2019 |
| CN | 110535611 A | 12/2019 |

(Continued)

OTHER PUBLICATIONS

LG Electronics Inc, Discussion on measurement and report for NR V2X, 3GPP TSG-RAN WG2 #105, R2-1900915, Feb. 25-Mar. 1, 2018, Athens, Greece.

(Continued)

*Primary Examiner* — Angela Nguyen
(74) *Attorney, Agent, or Firm* — Price Heneveld LLP

(57) ABSTRACT

The present disclosure discloses an information transmission method and a terminal device. The information transmission method includes: transmitting assistance information to at least one second terminal device if a periodic reporting condition or a preset trigger condition is met, where the assistance information is used for the at least one second terminal device to perform sidelink transmission.

20 Claims, 6 Drawing Sheets

---

Receive assistance information, where the assistance information is transmitted by a first terminal device in a case that a periodic reporting condition or a preset trigger condition is met, and the assistance information is used for sidelink transmission     ~201

(56) References Cited

U.S. PATENT DOCUMENTS

| | | |
|---|---|---|
| 2021/0120614 A1 | 4/2021 | Lu et al. |
| 2021/0204283 A1 | 7/2021 | Zhao et al. |
| 2022/0272717 A1 | 8/2022 | Chen et al. |

FOREIGN PATENT DOCUMENTS

| | | |
|---|---|---|
| CN | 110771257 A | 2/2020 |
| EP | 3905733 A1 | 3/2021 |
| JP | 2019507532 A | 3/2019 |
| WO | 2019031808 A1 | 2/2019 |
| WO | 2019196826 A1 | 10/2019 |
| WO | 2019196894 A1 | 10/2019 |
| WO | 2019214637 A1 | 11/2019 |
| WO | 2020006388 A1 | 1/2020 |
| WO | 2020006736 A1 | 1/2020 |
| WO | 2020056608 A1 | 3/2020 |
| WO | 2020056680 A1 | 3/2020 |
| WO | 2020060333 A1 | 3/2020 |

OTHER PUBLICATIONS

Mediatek Inc., UE-assisted resource allocation for NR V2X, 3GPP TSG-RAN WG2 Meeting #105, R2-1900815, Feb. 25-Mar. 1, 2019, Athens, Greece.

CMCC, "Discussion on sidelink resource allocation mechanism", 3GPP TSG RAN WG1 #97, R1-1906515, Reno, USA, May 13-17, 2019.

Intel Corporation, "Summary for A 7.2.4.2.2 Mode-2 Resource Allocation", 3GPP TSG RAN WG1 Meeting #97, R1-1907699, Reno, USA, May 13-17, 2019.

"3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985 V1.1.0 (Feb. 2020), Valbonne, France.

"3rd Generation Partnership Project; Technical Specification Group Radio Access Network; NR; Study on Vehicle-to- Everything (Release 16)", 3GPP TR 38.885 V1.0.0 (Nov. 2018), Valbonne, France.

\* cited by examiner

Transmit assistance information to at least one second terminal device if a periodic reporting condition or a preset trigger condition is met, where the assistance information is used for the at least one second terminal device to perform sidelink transmission ~101

Receive assistance information, where the assistance information is transmitted by a first terminal device in a case that a periodic reporting condition or a preset trigger condition is met, and the assistance information is used for sidelink transmission — 201

INFORMATION TRANSMISSION METHOD AND TERMINAL DEVICE

CROSS-REFERENCE TO RELATED APPLICATIONS

The present disclosure is continuation application of PCT International Application No. PCT/CN2021/083240 filed on Mar. 26, 2021, which claims priority to Chinese Patent Application No. 202010231316.7, filed with the China National Intellectual Property Administration on Mar. 27, 2020 and entitled "INFORMATION TRANSMISSION METHOD AND TERMINAL DEVICE", which are incorporated in their entireties by reference herein.

TECHNICAL FIELD

The present disclosure relates to the communications field, and in particular, to an information transmission method and a terminal device.

BACKGROUND

Currently, a long term evolution (LTE) system supports sidelink (SL, which may also be referred to as a secondary link or the like) transmission. An SL is used for direct data transmission between user equipments (UEs) without using a network device, as shown in FIG. 1.

There are some scenarios in SL communication, for example, (1) when receive (RX) UE and transmit (TX) UE on a sidelink perform session communication in a half-duplex mode, the RX UE cannot simultaneously perform transmitting and receiving due to a limitation of the half-duplex communication mode; and (2) when RX UE on a sidelink receives physical sidelink shared channels (PSSCH) from a plurality of TX UEs and the plurality of PSSCHs transmit physical sidelink feedback channels (PSFCH), if PSFCHs corresponding to different PSSCH transmissions fall on the same PSFCH occasion, the RX UE may not be able to simultaneously transmit a plurality of PSFCHs due to a limitation of a UE capability or power control. Limitations in these scenarios or constraints of some hardware conditions result in degradation of reliability of sidelink transmission.

SUMMARY

According to a first aspect, an embodiment of the present disclosure provides an information transmission method, applied to a first terminal device, where the method includes: transmitting assistance information to at least one second terminal device if a periodic reporting condition or a preset trigger condition is met, where the assistance information is used for the at least one second terminal device to perform sidelink transmission.

According to a second aspect, an embodiment of the present disclosure provides a first terminal device, including a transmitting module, configured to transmit assistance information to at least one second terminal device in a case that a periodic reporting condition or a preset trigger condition is met, where the assistance information is used for the at least one second terminal device to perform sidelink transmission.

According to a third aspect, an embodiment of the present disclosure provides an information transmission method, applied to a second terminal device, where the method includes: receiving assistance information, where the assistance information is transmitted by a first terminal device in a case that a periodic reporting condition or a preset trigger condition is met, and the assistance information is used for sidelink transmission.

According to a fourth aspect, an embodiment of the present disclosure provides a second terminal device, including a receiving module, configured to receive assistance information, where the assistance information is transmitted by a first terminal device in a case that a periodic reporting condition or a preset trigger condition is met, and the assistance information is used for sidelink transmission.

According to a fifth aspect, an embodiment of the present disclosure provides a terminal device, including a memory, a processor, and a computer program stored in the memory and capable of running on the processor, where when the computer program is executed by the processor, the steps of the method according to the embodiment of the first aspect are implemented; or when the computer program is executed by the processor, the steps of the method according to the embodiment of the third aspect are implemented.

According to a sixth aspect, an embodiment of the present disclosure provides a computer-readable storage medium, where the computer-readable storage medium stores a computer program, and when the computer program is executed by a processor, the steps of the method according to the embodiment of the first aspect are implemented; or when the computer program is executed by the processor, the steps of the method according to the embodiment of the third aspect are implemented.

BRIEF DESCRIPTION OF DRAWINGS

The accompanying drawings described herein are intended for better understanding of the present disclosure, and constitute a part of the present disclosure. Example embodiments of the present disclosure and descriptions thereof are intended to explain the present disclosure, but do not constitute any inappropriate limitation on the present disclosure. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art present disclosure shall fall within the protection scope of the present disclosure.

The technical solutions of the present disclosure may be applied to various communications systems, for example, a global system for mobile communications (GSM), a code division multiple access (CDMA) system, a wideband code division multiple access (WCDMA) system, a general packet radio service (GPRS) system, a long term evolution/long term evolution advanced (LTE-A) system, and an NR system.

User equipment UE may also be referred to as a terminal device (Mobile Terminal), mobile user equipment, or the like, and may communicate with one or more core networks through a radio access network (RAN). The user equipment may be a terminal device, such as a mobile phone (or referred to as a "cellular" phone) or a computer with a terminal device. For example, the user equipment may be a portable, pocket-sized, handheld, computer built-in, or in-vehicle mobile apparatus, which exchanges voice and/or data with the radio access network.

A network device may also be referred to as a base station, and may be a base transceiver station (BTS) in GSM or CDMA, a NodeB in WCDMA, an evolved NodeB (eNB or e-NodeB) in LTE, or a 5G NodeB (gNB).

The technical solutions provided in the embodiments of the present disclosure are described in detail below with reference to the accompanying drawings.

Figures 1, 2:
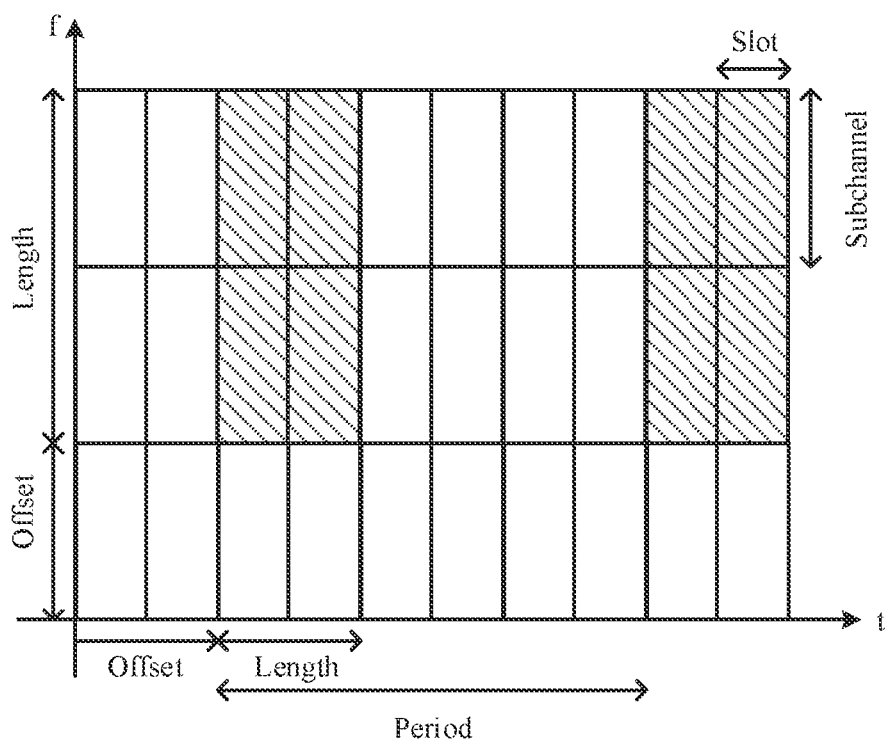
FIG. 1 is a schematic flowchart of an information transmission method according to an embodiment of the present disclosure.
FIG. 2 is a schematic diagram of a resource set indication according to an embodiment of the present disclosure.

As shown in FIG. 1, an embodiment of the present disclosure provides an information transmission method, which is performed by a first terminal device that performs sidelink transmission with each of at least one second terminal device. The method includes the following process steps.

Step 101: Transmit assistance information to the at least one second terminal device if a periodic reporting condition or a preset trigger condition is met, where the assistance information is used for the at least one second terminal device to perform sidelink transmission.

In this embodiment of the present disclosure, when sidelink transmission is performed between the first terminal device and each of the at least one second terminal device, the assistance information that can be used by each second terminal device to perform sidelink transmission may be transmitted to the at least one second terminal device when the periodic reporting condition or the preset trigger condition is met, to improve reliability of sidelink transmission.

It can be understood that the first terminal device may transmit the assistance information to one or more second terminal devices or one or more groups of second terminal devices. For example, the assistance information is transmitted to the at least one second terminal device through reporting or broadcasting. The assistance information may be used by the at least one second terminal device to perform resource selection or parameter adjustment for sidelink transmission.

It should be noted that, when a resource allocation mode used by the second terminal device is a mode 2, to be specific, a resource allocation mode in which UE autonomously performs selection, a conflict in resource selection may occur between different TX UEs, and the assistance information may be used to partially resolve the resource conflict problem.

Optionally, in the information transmission method in this embodiment of the present disclosure, the assistance information includes but is not limited to at least one of the following: a resource set indication, a resource reselection indication, a demodulation reference signal (DMRS) pattern indication, a DMRS port number indication, a DMRS port index indication, a transmit power indication, a modulation and coding scheme (MCS) indication, a hybrid automatic repeat request (HARQ) feedback activation indication, and a HARQ feedback type indication.

It should be noted that the assistance information should include at least the resource set indication used to indicate at least one of the following content: a time domain resource corresponding to a resource set, a frequency domain resource corresponding to the resource set, and a plurality of resource subsets into which the resource set is correspondingly divided. This can assist with resource selection when each second terminal device performs sidelink transmission, to improve reliability of transmission between UEs that perform sidelink transmission. Further, on the basis of the resource set indication, the assistance information may further include at least one of the resource reselection indication, the DMRS pattern indication, the DMRS port number indication, the DMRS port index indication, the transmit power indication, the MCS indication, the HARQ feedback activation indication, and the HARQ feedback type indication.

The first terminal device may indicate, by using the DMRS pattern indication, the at least one second terminal device to transmit a high-density DMRS, to reduce complexity of channel estimation performed by the first terminal device; or indicate the at least one second terminal device to transmit a low-density DMRS, to reduce overheads.

When the HARQ feedback type indication is used to indicate a HARQ feedback type of broadcast transmission, the HARQ feedback type includes but is not limited to the following two feedback forms: (1) All RX UEs share a PSFCH resource, and the UEs feed back only negative acknowledgements (NACK). (2) RX UEs occupy different PSFCH resources, and the RX UEs feed back acknowledgments (ACK) or NACKs on their respective resources. Optionally, in the information transmission method in this embodiment of the present disclosure, in a case that the assistance information includes the resource set indication, the resource set indication includes at least one of a time domain resource indication and a frequency domain resource indication.

The time domain resource indication is used to indicate at least one of a period, an offset, a length, a granularity, and a resource indication mode of a time domain resource in a resource set.

Optionally, the granularity indicated by the time domain resource indication may include but is not limited to at least one of the following: a slot ( ) a sub-slot (sub-slot(s)), a length of a PSFCH occasion, a PSFCH period, and absolute time duration. The offset indicated by the time domain resource indication may include but is not limited to at least one of the following: a system frame number (SFN) #, a D2D frame number (DFN) #0, and a starting position of a resource pool. The time domain resource indication mode may be performing indication in a fine-grained form, for example, a period, an offset, a length, or a granularity. As shown in FIG. 2, specifically, a slot granularity is used as an example. Alternatively, the time domain resource indication mode may be a bitmap form, namely, a simple and flexible form, including but not limited to indicating at least one of the following: a length and a starting position of a bitmap, and a time domain granularity indicated by the bitmap.

The frequency domain resource indication is used to indicate at least one of an offset, a length, a granularity, and a resource indication mode of a frequency domain resource in a resource set.

Optionally, the granularity indicated by the frequency domain resource indication may include but is not limited to at least one of the following: a physical resource block (PRB), a subcarrier, a resource pool length, a subchannel, a component carrier (CC), band, and an absolute frequency domain width. The offset indicated by the frequency domain resource indication may include but is not limited to at least one of the following: a PRB 0, a common resource block (CRB) 0, a point A, a starting position of a pool, and a starting position of a bandwidth part (BWP). The frequency domain resource indication mode may be performing indication in a fine-grained form, for example, an offset, a length, or a granularity. As shown in FIG. 2, specifically, a subchannel granularity is used as an example. Alternatively, the frequency domain resource indication mode may be a bitmap form, namely, a simple and flexible form, including but not limited to indicating at least one of the following: a length and a starting position of a bitmap, and a frequency domain granularity indicated by the bitmap.

Optionally, parameters in the time domain resource indication and the frequency domain resource indication may be obtained in one of the following manners: being preconfigured, being stipulated in a protocol, being configured by a control node (for example, being configured by using higher layer signaling-radio resource control (RRC), PC5-RRC, or PC5-S), being dynamically indicated by the control node (for example, being indicated by using downlink control information (DCI), sidelink control information (SCI), or a medium access control-control element (indication such as MAC CE), being dynamically indicated by an assistance node, or being based on a preset rule.

Optionally, in the information transmission method in this embodiment of the present disclosure, in a case that the assistance information includes the resource set indication and a resource set is divided into a plurality of resource subsets, the resource set indication includes a resource subset indication.

The resource subset indication is used to indicate at least one of a time domain granularity, a frequency domain granularity, a time domain starting position, a frequency domain starting position, a time domain length, a frequency domain length, a time domain period, a frequency domain period, and a resource subset indication mode that correspond to the resource subsets. The time domain length may be the number of resource subsets or the number of resource subsets in time domain. The frequency domain length may be the number of resource subsets or the number of resource subsets in frequency domain.

Optionally, time-frequency resource division of a resource subset may be implemented in one of the following manners: being preconfigured, being stipulated in a protocol, being configured by a control node, being dynamically indicated by the control node, or being based on a preset rule.

Figure 3:
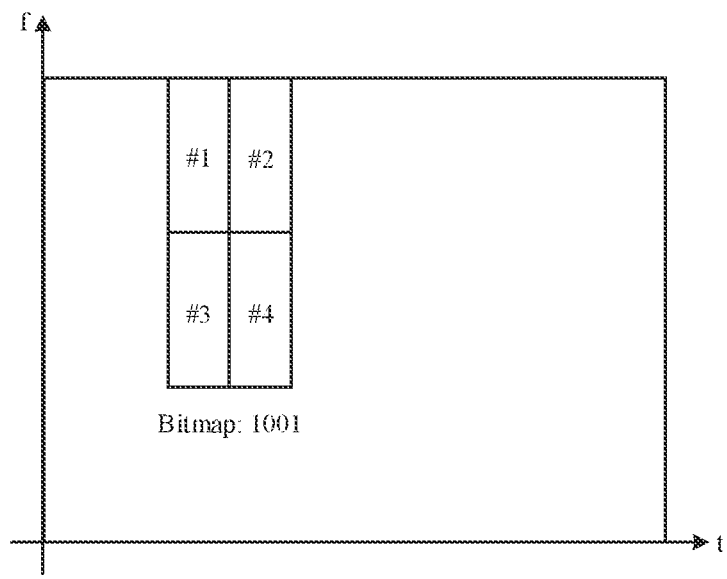
FIG. 3 is a schematic diagram of another resource set indication according to an embodiment of the present disclosure.

Optionally, in the information transmission method in this embodiment of the present disclosure, subset-based resource indication may be performed in a bitmap form. Bitmap coding may be performed in time domain and then in frequency domain, or may be performed in frequency domain and then in time domain. As shown in FIG. 3, a resource set is divided into four resource subsets, and an indicated resource is included in resource subsets #1 and #4. In this case, a bitmap may be coded in time domain and then in frequency domain into 1001. Herein, 1 indicates that the resource is included, and 0 indicates that the resource is not included. Certainly, in another embodiment of the present disclosure, alternatively, 1 may be used to indicate that the resource is not included, and 0 is used to indicate that the resource is included.

Optionally, in the information transmission method in this embodiment of the present disclosure, in an aspect, step 101 may be performed as follows: in a case that the periodic reporting condition is met, transmitting the assistance information to the at least one second terminal device. In other words, the first terminal device may actively and periodically transmit the assistance information to the at least one second terminal device. The first terminal device may implement periodic reporting in one of the following manners (1) to (3):

(1) being preconfigured;
(2) being configured by a control node, where the control node may include: a network device, for example, a base station; or a terminal device with a scheduling function, for example, group head UE in a UE group, relayUE, or a road side unit (RSU); and
(3) being stipulated in a protocol.

Further, optionally, a period and/or a resource for implementing periodic reporting of the assistance information may be determined in one of the foregoing manners.

Optionally, in the information transmission method in this embodiment of the present disclosure, in another aspect, step 101 may be performed as follows: in a case that the preset trigger condition is met, transmitting the assistance information to the at least one second terminal device. In other words, the first terminal device may passively transmit the assistance information to the at least one second terminal device after being triggered, to avoid unnecessary signaling overheads. Whether the preset trigger condition for transmitting the assistance information is met may be determined in different manners, including but not limited to the following specific embodiments.

Embodiment 1

In Embodiment 1, if first trigger signaling transmitted by a control node is received, it is determined that the preset trigger condition is met, where the first trigger signaling is used to indicate the first terminal device to transmit the assistance information to the at least one second terminal device. In other words, the assistance information may be transmitted based on triggering by the control node.

The first trigger signaling may be physical layer signaling or higher layer signaling, including but not limited to DCI signaling, MAC CE signaling, and RRC signaling. Optionally, when the first trigger signaling is RRC signaling, the RRC signaling may be further used to configure a transmission time period of the assistance information, to specify when to transmit the assistance information.

Further, optionally, the first trigger signaling includes a target indication field, and the target indication field is used to indicate the first terminal device to transmit the assistance information to the at least one second terminal device. The target indication field may be a fixed field in the first trigger signaling. For example, the target indication field may be an independent field in the first trigger signaling, or a field jointly coded with another indication field.

Optionally, in a case that the first trigger signaling is DCI signaling, the first trigger signaling may include one of the following (1) and (2):
(1) DCI signaling in a target downlink control information DCI format, in other words, the first trigger signaling may be signaling with a new DCI format; and
(2) DCI signaling scrambled by using a target radio network temporary identifier (RNTI), in other words, the first trigger signaling may be DCI signaling scrambled by using a specific RNTI.

Embodiment 2

In Embodiment 2, if second trigger signaling transmitted by the at least one second terminal device is received, it is determined that the preset trigger condition is met, where the second trigger signaling is used to indicate the first terminal device to transmit the assistance information to the at least one second terminal device. In other words, the assistance information may be transmitted based on triggering by a terminal device that performs sidelink transmission with the first terminal device, to avoid unnecessary signaling overheads.

The second trigger signaling may be: MAC CE signaling; SCI signaling, for example, triggering may be performed by using a specific field or a reused field in 2nd stage SCI; or RRC signaling, for example, triggering is performed by using sidelink interface (also referred to as a PC5 interface) RRC.

Further, optionally, based on Embodiment 2, the step of transmitting the assistance information to the at least one second terminal device may be performed as follows: transmitting the assistance information to the at least one second terminal device within a target transmission time period, where a manner of determining the target transmission time period includes one of the following: being indicated by the second trigger signaling; being stipulated in a protocol; being configured by a control node; and being preconfigured.

It can be understood that, in the manner of triggering by the terminal device that performs sidelink transmission with the first terminal device, a period for transmitting the assistance information may be further limited, to provide the corresponding assistance information for the at least one second terminal device in a timely manner, and ensure efficiency of sidelink transmission. Optionally, the target transmission time period may be within one or more time units after the second trigger signaling is received, where the time unit may be but is not limited to at least one of the following: a slot(s), a sub-slot(s), a logical slot, a logical sub-slot, a PSFCH period, a PSFCH occasion, and an absolute time.

Optionally, in the information transmission method in this embodiment of the present disclosure, the second trigger signaling is transmitted by the at least one second terminal device in a case that at least one of the following conditions (1) to (3) is met:
(1) at least one of a NACK message and/or a discontinuous transmission (DTX) is continuously detected, for example, the assistance information may be transmitted when the number of detected NACK messages and/or the number of detected DTXs exceeds a threshold, where the threshold may be a value defined by a protocol, preconfigured, or configured by a control node;
(2) before a transport block (TB) whose priority is higher than a priority threshold or whose quality of service (QoS) is higher than a QoS threshold is transmitted, where the priority threshold or the QoS threshold may be preconfigured, stipulated in a protocol, or configured by a control node, and the QoS threshold may include a reliability threshold or a latency threshold; and
(3) a first measurement value between the at least one second terminal device and the first terminal device is less than a first measurement threshold, where the first measurement value includes at least one of a reference signal received power (RSRP) measurement value and a distance measurement value, and the first measurement threshold may be preconfigured, stipulated in a protocol, or configured by a control node.

Optionally, the second trigger signaling is transmitted by the at least one second terminal device at a preset time interval, and the preset time interval is less than a time interval threshold. This can ensure that the first terminal device does not frequently receive trigger signaling initiated by a corresponding second terminal device for requesting assistance information, in other words, frequency of trigger signaling transmitted by the second terminal device within a unit time should not be too high.

The frequency threshold may be preconfigured, stipulated in a protocol, or configured by a control node. Further, optionally, the frequency threshold may be associated with a target channel busy ratio (CBR) or a target occupancy ratio (CR), in other words, corresponding frequency thresholds are separately configured for different CBR ranges or CR ranges.

Embodiment 3

Figure 4:
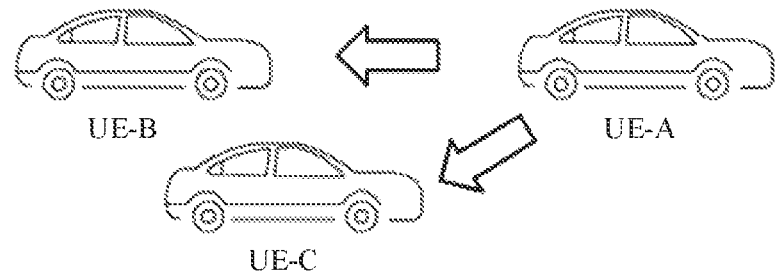
FIG. 4 is a schematic diagram of a scenario in which a first terminal device actively triggers transmission of assistance information according to an embodiment of the present disclosure.
Figure 4:
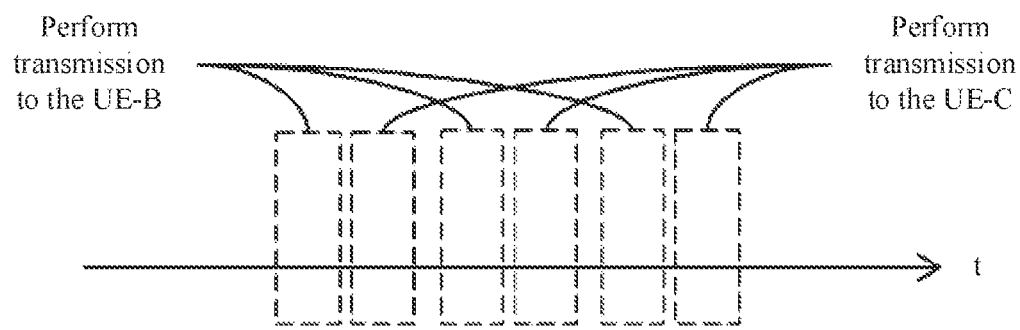

In Embodiment 3, before transmitting the assistance information to the at least one second terminal device if the preset trigger condition is met, the first terminal device may autonomously determine whether the preset trigger condition is met, where the preset trigger condition includes but is not limited to at least one of the following:
(1) A second measurement value between the first terminal device and each of the at least one second terminal device is less than a second measurement threshold, where the second measurement value includes at least one of an RSRP measurement value and a distance measurement value. The second measurement threshold may be preconfigured, stipulated in a protocol, or configured by a control node.
(2) The first terminal device has at least one radio resource control RRC connection based on a PC5 interface. To be specific, the first terminal device may transmit the assistance information to the at least one second terminal device that has established a PC5-RRC connection to the first terminal device. As shown in FIG. 4, UE-A has established a PC5-RRC connection to each of UE-B and UE-C. In this case, the UE-A may transmit assistance information to each of the UE-B and the UE-C.

Optionally, that the first terminal device may transmit the assistance information to the at least one second terminal device that has established a PC5-RRC connection to the first terminal device includes: transmitting the assistance information to a second terminal device that has established a PC5-RRC connection to the first terminal device for the first time. To be specific, second terminal devices that have established PC5-RRC connections to the first terminal device include both a second terminal device that has established a connection to the first terminal device for the first time and a second terminal device that has established a connection to the first terminal device not for the first time. In this case, the assistance information may be transmitted only to the second terminal device that has established the PC5-RRC connection to the first terminal device for the first time; or the assistance information may be periodically transmitted to each second terminal device that has established a PC5-RRC connection to the first terminal device; or the first terminal device may determine when to transmit the assistance information to each second terminal device.

Figure 5:
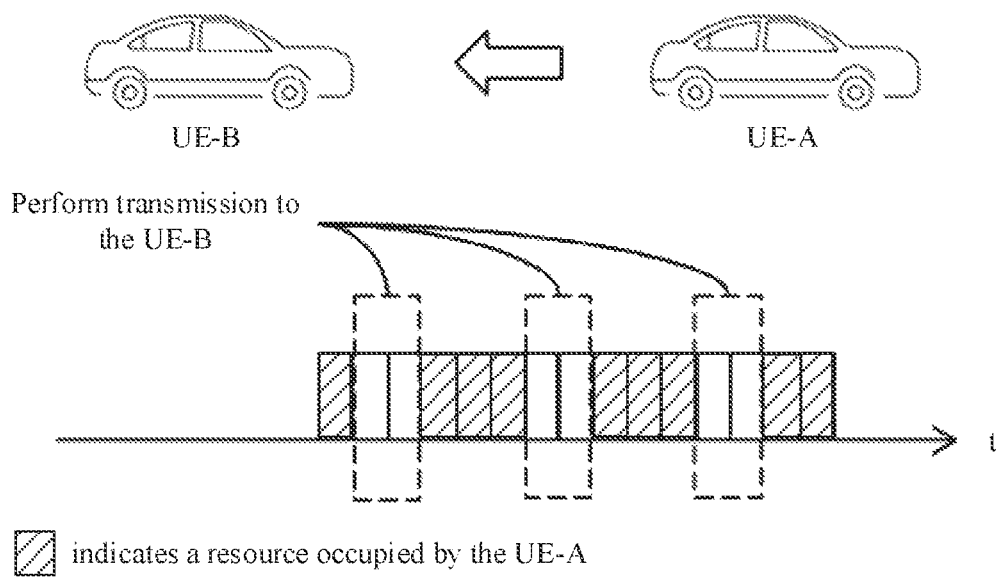
FIG. 5 is a schematic diagram of a second scenario in which a first terminal device actively triggers transmission of assistance information according to an embodiment of the present disclosure.

(3) The number of occupied resources, the number of to-be-occupied resources, or the number of reserved resources is greater than a resource number threshold, where the resources may include a time domain resource and/or a frequency domain resource. In an example, as shown in FIG. 5, UE-A triggers transmission of assistance information to UE-B each time when time domain resources occupied by the UE-A reach a preset number (namely, a resource threshold).

The resource threshold is an occupation ratio within a time window, and a length of the time window may be preconfigured, stipulated in a protocol, or configured by a control node. In addition, the assistance information may be transmitted within one or more time units prior to arrival of the time window.

Figures 6, 7:
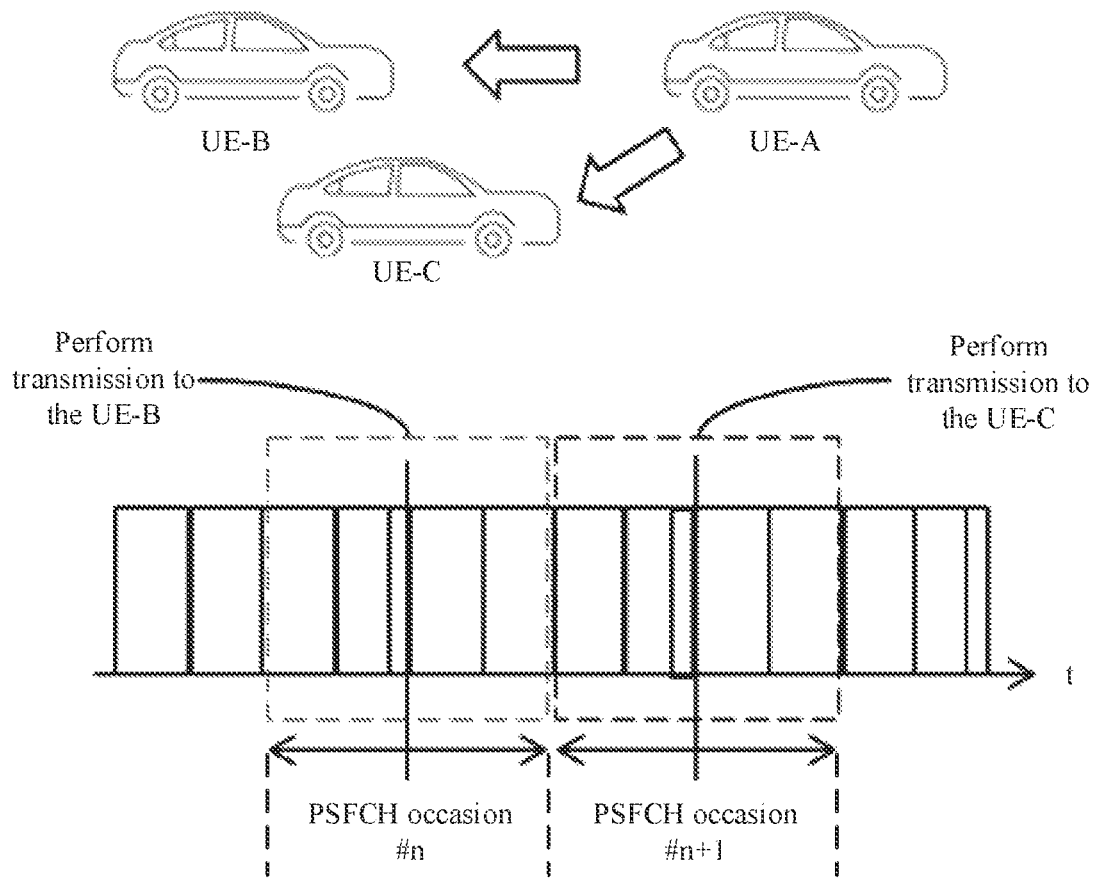
FIG. 6 is a schematic diagram of a third scenario in which a first terminal device actively triggers transmission of assistance information according to an embodiment of the present disclosure.
FIG. 7 is a schematic flowchart of a second information transmission method according to an embodiment of the present disclosure.

(4) A conflict is detected in hybrid automatic repeat request HARQ feedback. As shown in FIG. 6, when UE-A detects that the UE-A receives PSSCHs of UE-B and UE-C, and PSFCHs corresponding to the PSSCHs of the UE-B and the UE-C fall on the same PSFCH occasion, but the UE-A cannot simultaneously transmit a plurality of PSFCHs due to a limitation of a capability or a transmit power of the UE-A, transmission of assistance information may be triggered.

(5) A resource collision is detected in physical sidelink shared channel PSSCH transmission.

Optionally, whether a resource collision occurs is determined based on a channel listening result. This includes but is not limited to the following two determining manners.

Manner 1: The first terminal device may determine, based on resource reservation signaling of a second terminal device, whether a resource of the second terminal device is subject to a resource collision.

In this manner, the first terminal device may receive resource reservation signaling transmitted by N second terminal devices, and the first terminal device may determine, based on the resource reservation signaling of the N second terminal devices, whether a resource of a first target terminal device of the N second terminal devices is subject to a resource collision, where N is greater than or equal to 1.

Further, in a case that at least one of the following conditions is met, it may be determined that the resource of the first target terminal device is subject to a resource collision:

resource reservation signaling of the first target terminal device includes overlapping resources;

energy of the resource reservation signaling of the first target terminal device is higher than a first threshold;

an energy difference between the resource reservation signaling of the first target terminal device and resource reservation signaling of a second target terminal device of the N second terminal devices is higher than a second threshold; and an energy ratio between the resource reservation signaling of the first target terminal device and resource reservation signaling of a third target terminal device of the N second terminal devices is higher than a third threshold, where any one of the first threshold to the third threshold may be stipulated in a protocol, configured by a control node, or preconfigured, and the energy may be expressed as a parameter such as an RSRP, a received signal strength indication (RSSI), or reference signal received quality (RSRQ).

Manner 2: Whether a resource of a second terminal device is subject to a resource collision is determined based on a channel detection result (or a blind detection result).

In this manner, the first terminal device may determine, based on a detection result of a first channel, whether the resource of the second terminal device is subject to a resource collision. The first channel may include a physical sidelink control channel (PSCCH) or a PSSCH.

Further, in a case that at least one of the following conditions is met, it may be determined that the resource of the second terminal device is subject to a resource collision:

no control information or data information of the first channel is detected;

energy of a first resource of the first channel is higher than a fourth threshold, where the first resource is a resource, of the first channel, that corresponds to the second terminal device; and it is detected that a signal to interference plus noise ratio (SINR) or a signal-to-noise ratio (SNR) of a second resource of the first channel is higher than a fifth threshold, where the second resource is a resource, of the first channel, that corresponds to the second terminal device, where any one of the fourth threshold and the fifth threshold may be stipulated in a protocol, configured by a control node, or preconfigured, and the energy may be expressed as a parameter such as an RSRP, an RSSI, or an RSRQ.

It should be noted that a receive terminal may alternatively determine, by combining Manner 1 and Manner 2, whether a resource of a transmit terminal is subject to a resource collision. To avoid repetition, details are not described herein again.

It can be understood that the action of transmitting the assistance information to the at least one second terminal device may be alternatively performed by the first terminal device when the first terminal device autonomously determines that a corresponding preset trigger condition is met.

Optionally, in any one of the foregoing specific embodiments in which the preset trigger condition is met, step 101 may be specifically performed as follows: if the preset trigger condition is met, semi-persistently or periodically transmitting the assistance information to the at least one second terminal device.

It can be understood that, when transmission of the assistance information is triggered by a specific preset trigger condition, periodic transmission of the assistance information may be semi-persistent (SP) transmission.

Optionally, in the information transmission method in this embodiment of the present disclosure, step 101 may be specifically performed as follows: transmitting the assistance information to the at least one second terminal device by using first signaling. In other words, the assistance information may be carried in signaling and transmitted to the at least one second terminal device.

The first signaling may be RRC signaling, DCI signaling, PC5-RRC signaling, MAC CE signaling, or SCI signaling. Optionally, if the first signaling is SL signaling (for example, PC5-RRC signaling or SCI signaling), the first signaling may be transmitted through a standalone PSCCH, or transmitted through a PSSCH or a PSCCH corresponding to a subchannel or a sub-slot.

Further, optionally, to enable the second terminal device to efficiently and accurately receive the assistance information for improving reliability of sidelink transmission, in addition to the assistance information, the first signaling may further carry at least one of the following (1) to (4):
 (1) a resource set indication mode in a case that the assistance information includes the resource set indication, where it can be understood that an indication field in the signaling may indicate a specific indication mode to be used in a case that a plurality of resource set indication modes are supported;
 (2) a signaling identifier used to indicate that the first signaling is used to transmit the assistance information;
 (3) an identifier (ID) of the first terminal device; and
 (4) an ID of the at least one second terminal device.

Optionally, the information transmission method in this embodiment of the present disclosure may further include the following content: transmitting second signaling to the at least one second terminal device, where the second signaling is used to indicate an effective time period of the assistance information. In other words, the at least one second terminal device is notified of validity duration of the assistance information.

Further, optionally, the effective time period of the assistance information includes one of the following (1) and (2):
 (1) A first number of time units starting from a first moment, where the first moment is a moment when a target transmit terminal device receives the assistance information. In other words, the assistance information takes effect within a time period starting from a moment when the second terminal device receives the assistance information, where the first number of time units starting from the first moment include a time unit to which the first moment belongs.

Optionally, the first number may be infinite, to be specific, starting from the moment when the assistance information is received, the assistance information is always valid; or a value of the first number may be autonomously determined by the first terminal device.
 (2) A second number of time units starting from a second moment, where the second moment is a moment that has an interval of a third number of time units from the moment when the target transmit terminal device receives the assistance information. In other words, the assistance information takes effect within a time period that has an interval from the moment when the second terminal device receives the assistance information.

Optionally, the time unit may be a slot, a sub-slot, or a symbol. Further, a subcarrier spacing (SCS) referenced by the time unit may be limited. The SCS may be an SCS corresponding to a BWP to which a resource used by the second terminal device to receive the assistance information belongs; or may be an SCS that is preconfigured, stipulated in a protocol, configured by a control node, or indicated by the control node by using signaling.

As shown in FIG. 7, an embodiment of the present disclosure provides an information transmission method, which is performed by a second terminal device that performs sidelink transmission with a first terminal device. The method includes the following process steps.

Step 201: Receive assistance information, where the assistance information is transmitted by the first terminal device in a case that a periodic reporting condition or a preset trigger condition is met, and the assistance information is used for sidelink transmission.

In this embodiment of the present disclosure, when the second terminal device performs sidelink transmission with the first terminal device, sidelink transmission may be implemented based on the assistance information transmitted by the first terminal device in a case that the periodic reporting condition or the preset trigger condition is met, to improve reliability of sidelink transmission.

Optionally, the assistance information may be used by the second terminal device to perform resource selection or parameter adjustment for sidelink transmission.

It should be noted that, when a resource allocation mode used by the second terminal device is a Mode 2, to be specific, a resource allocation mode in which UE autonomously performs selection, a conflict in resource selection may occur between different TX UEs, and the assistance information may be used to partially resolve the resource conflict problem.

Optionally, in the information transmission method in this embodiment of the present disclosure, the assistance information includes at least one of the following: a resource set indication, a resource reselection indication, a demodulation reference signal DMRS pattern indication, a DMRS port number indication, a DMRS port index indication, a transmit power indication, a modulation and coding scheme MCS indication, a HARQ feedback activation indication, and a HARQ feedback type indication.

It should be noted that the assistance information should include at least the resource set indication used to indicate at least one of the following content: a time domain resource corresponding to a resource set, a frequency domain resource corresponding to the resource set, and a plurality of resource subsets into which the resource set is correspondingly divided. This can assist with resource selection when the second terminal device performs sidelink transmission, to improve reliability of transmission between UEs that perform sidelink transmission. Further, on the basis of the resource set indication, the assistance information may further include at least one of the resource reselection indication, the DMRS pattern indication, the DMRS port number indication, the DMRS port index indication, the transmit power indication, the MCS indication, the HARQ feedback activation indication, and the HARQ feedback type indication.

A high-density DMRS may be transmitted based on the DMRS pattern indication, to reduce complexity of channel estimation performed by the first terminal device; or a low-density DMRS may be transmitted, to reduce overheads. In addition, when the HARQ feedback type indication is used to indicate a HARQ feedback type of broadcast transmission, the second terminal device may share a PSFCH resource with another terminal device, and feed back only a NACK; or may occupy a PSFCH resource different from that occupied by another terminal device, and feed back an ACK or a NACK based on the occupied PSFCH resource.

Optionally, in the information transmission method in this embodiment of the present disclosure, in a case that the assistance information includes the resource set indication, the resource set indication includes at least one of a time domain resource indication and a frequency domain resource indication.

The time domain resource indication is used to indicate at least one of a period, an offset, a length, a granularity, and a resource indication mode of a time domain resource in a resource set.

Optionally, the granularity indicated by the time domain resource indication may include but is not limited to at least one of the following: a slot(s), a sub-slot(s), a length of a PSFCH occasion, a PSFCH period, and absolute time duration. The offset indicated by the time domain resource indication may include but is not limited to at least one of the following: an SFN #0, a DFN #0, and a starting position of a resource pool (pool). The time domain resource indication mode may be performing indication in a fine-grained form, for example, a period, an offset, a length, or a granularity. Alternatively, the time domain resource indication mode may be a bitmap form, namely, a simple and flexible form, including but not limited to indicating at least one of the following: a length and a starting position of a bitmap, and a time domain granularity indicated by the bitmap.

The frequency domain resource indication is used to indicate at least one of an offset, a length, a granularity, and a resource indication mode of a frequency domain resource in a resource set.

Optionally, the granularity indicated by the frequency domain resource indication may include but is not limited to at least one of the following: a physical resource block, a subcarrier, a resource pool length, a subchannel, a component carrier, bandwidth, and an absolute frequency domain width. The offset indicated by the frequency domain resource indication may include but is not limited to at least one of the following: a PRB 0, a common resource block 0, a point A, a starting position of a pool, and a starting position of a bandwidth part. The frequency domain resource indication mode may be performing indication in a fine-grained form, for example, an offset, a length, or a granularity. Alternatively, the frequency domain resource indication mode may be a bitmap form, namely, a simple and flexible form, including but not limited to indicating at least one of the following: a length and a starting position of a bitmap, and a frequency domain granularity indicated by the bitmap.

Optionally, parameters in the time domain resource indication and the frequency domain resource indication may be obtained in one of the following manners: being preconfigured, being stipulated in a protocol, being configured by a control node (for example, being configured by using higher layer signaling-RRC, PC5-RRC, or PC5-S), being dynamically indicated by the control node (for example, being indicated by using DCI, SCI, or a MAC CE), being dynamically indicated by an assistance node, or being based on a preset rule.

Optionally, in the information transmission method in this embodiment of the present disclosure, subset-based resource indication may be performed in a bitmap form. Bitmap coding may be performed in time domain and then in frequency domain, or may be performed in frequency domain and then in time domain.

Optionally, in the information transmission method in this embodiment of the present disclosure, before step 201, the method may further include: transmitting trigger signaling to the first terminal device, where the trigger signaling is used to indicate the first terminal device to transmit the assistance information to the second terminal device.

It can be understood that unnecessary signaling overheads can be avoided by transmitting the trigger signaling to the first terminal device to trigger transmission of the assistance information. The trigger signaling may be: MAC CE signaling; sidelink control information SCI signaling, for example, triggering may be performed by using a specific field or a reused field in 2nd stage SCI; or RRC signaling, for example, triggering is performed by using sidelink interface (also referred to as a PC5 interface) RRC.

Optionally, the trigger signaling may be further used to indicate the first terminal device to transmit the assistance information to the second terminal device within a target transmission time period. The target transmission time period may be within one or more time units after the first terminal device receives the trigger signaling, where the time unit may be but is not limited to at least one of the following: a slot (slot(s)), a sub-slot (sub-slot(s)), a logical slot (Logical slot(s)), a logical sub-slot (Logical sub-slot(s)) a PSFCH period, a PSFCH occasion, and an absolute time.

Optionally, in the information transmission method in this embodiment of the present disclosure, the step of transmitting the trigger signaling to the first terminal device may be performed as the following content:

transmitting the trigger signaling to the first terminal device in a case that at least one of the following conditions is met:
(1) at least one of a NACK message and/or a DTX is continuously detected, for example, the assistance information may be transmitted when the number of detected NACK messages and/or the number of detected DTXs exceeds a threshold, where the threshold may be a value defined by a protocol, preconfigured, or configured by a control node;
(2) before a transport block TB whose priority is higher than a priority threshold or whose quality of service QoS is higher than a QoS threshold is transmitted, where the priority threshold or the QoS threshold may be preconfigured, stipulated in a protocol, or configured by a control node, and the QoS threshold may include a reliability threshold or a latency threshold; and
(3) a first measurement value between the second terminal device and the first terminal device is less than a first measurement threshold, where the first measurement value includes at least one of a reference signal received power RSRP measurement value and a distance measurement value, and the first measurement threshold may be preconfigured, stipulated in a protocol, or configured by a control node.

Optionally, in the information transmission method in this embodiment of the present disclosure, the step of transmitting the trigger signaling to the first terminal device may be performed as the following content: transmitting the trigger signaling to the first terminal device at a preset time interval, where the preset time interval is less than a time interval threshold. In other words, frequency of trigger signaling transmitted within a unit time should not be too high. This can ensure that trigger signaling for requesting assistance information is not frequently initiated to the first terminal device.

The frequency threshold may be preconfigured, stipulated in a protocol, or configured by a control node. Further, optionally, the frequency threshold may be associated with a target channel busy ratio CBR or a target occupancy ratio CR, in other words, corresponding frequency thresholds are separately configured for different CBR ranges or CR ranges.

It should be noted that, in addition to that the second terminal device triggers the first terminal device to transmit the assistance information, alternatively, a control node may trigger the first terminal device to transmit the assistance information, or the first terminal device may periodically transmit the assistance information, or the first terminal device may transmit the assistance information when the first terminal device determines that a specific preset trigger condition is met. For specific related content, refer to the related content in the foregoing embodiment of the information transmission method performed by the first terminal device. Details are not described herein again.

Optionally, in the information transmission method in this embodiment of the present disclosure, step 201 may be specifically performed as follows: receiving first signaling, where the first signaling carries the assistance information. In other words, the assistance information may be received in a manner in which signaling carries the assistance information.

The first signaling may be RRC signaling, DCI signaling, PC5-RRC signaling, MAC CE signaling, or SCI signaling. Optionally, if the first signaling is SL signaling (for example, PC5-RRC signaling or SCI signaling), the first signaling may be transmitted through a standalone PSCCH, or transmitted through a PSSCH or a PSCCH corresponding to a subchannel or a sub-slot.

Further, optionally, to enable the second terminal device to efficiently and accurately receive the assistance information for improving reliability of sidelink transmission, the first signaling may further carry at least one of the following (1) to (4):

(1) a resource set indication mode in a case that the assistance information includes the resource set indication, where it can be understood that an indication field in the signaling may indicate a specific indication mode to be used in a case that a plurality of resource set indication modes are supported;

(2) a signaling identifier used to indicate that the first signaling is used to transmit the assistance information;

(3) an identifier ID of the first terminal device; and (4) an identifier ID of the at least one second terminal device.

Optionally, in the information transmission method in this embodiment of the present disclosure, an effective time period of the assistance information used to perform sidelink transmission may be obtained in different manners, including but not limited to the following specific embodiments.

Embodiment 1

In Embodiment 1, the information transmission method in this embodiment of the present disclosure may further include the following content: receiving second signaling from the first terminal device, where the second signaling is used to indicate the effective time period of the assistance information. In other words, the effective time period of the assistance information may be learned from signaling transmitted by the first terminal device.

Embodiment 2

In Embodiment 2, a manner of determining the effective time period of the assistance information includes: being preconfigured, being stipulated in a protocol, or being configured by a control node.

Optionally, the effective time period of the assistance information in any one of the foregoing specific embodiments may include one of the following (1) and (2):

(1) A first number of time units starting from a first moment, where the first moment is a moment when a target transmit terminal device receives the assistance information. In other words, the assistance information takes effect within a time period starting from a moment when the second terminal device receives the assistance information, where the first number of time units starting from the first moment include a time unit to which the first moment belongs.

Optionally, the first number may be infinite, to be specific, starting from the moment when the assistance information is received, the assistance information is always valid; or a value of the first number may be autonomously determined by the first terminal device.

(2) A second number of time units starting from a second moment, where the second moment is a moment that has an interval of a third number of time units from the moment when the target transmit terminal device receives the assistance information. In other words, the assistance information takes effect within a time period that has an interval from the moment when the second terminal device receives the assistance information.

Optionally, the time unit may be a slot, a sub-slot, or a symbol. Further, a subcarrier spacing SCS referenced by the time unit may be limited. The SCS may be an SCS corresponding to a BWP to which a resource used by the second terminal device to receive the assistance information belongs; or may be an SCS that is preconfigured, stipulated in a protocol, configured by a control node, or indicated by the control node by using signaling.

Figure 8:
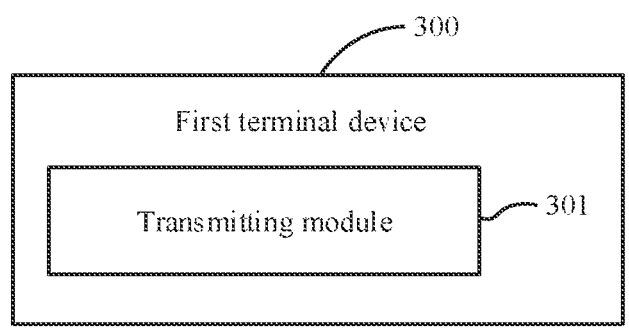
FIG. 8 is a schematic structural diagram of a first terminal device according to an embodiment of the present disclosure.

As shown in FIG. 8, an embodiment of the present disclosure provides a first terminal device 300. The first terminal device 300 includes a transmitting module 301, configured to transmit assistance information to at least one second terminal device in a case that a periodic reporting condition or a preset trigger condition is met, where the assistance information is used for the at least one second terminal device to perform sidelink transmission.

Optionally, the first terminal device 300 in this embodiment of the present disclosure may further include a determining module, configured to: before the assistance information is transmitted to the at least one second terminal device, in a case that first trigger signaling transmitted by a control node is received, determine that the preset trigger condition is met, where the first trigger signaling is used to indicate the first terminal device to transmit the assistance information to the at least one second terminal device.

Optionally, in the first terminal device 300 in this embodiment of the present disclosure, the first trigger signaling includes a target indication field, and the target indication field is used to indicate the first terminal device to transmit the assistance information to the at least one second terminal device.

Optionally, in the first terminal device 300 in this embodiment of the present disclosure, the first trigger signaling includes one of the following: DCI signaling in a target downlink control information DCI format; and DCI signaling scrambled by using a target radio network temporary identifier RNTI.

Optionally, in the first terminal device 300 in this embodiment of the present disclosure, the determining module may be further configured to: before the assistance information is transmitted to the at least one second terminal device, in a case that second trigger signaling transmitted by the at least one second terminal device is received, determine that the preset trigger condition is met, where the second trigger signaling is used to indicate the first terminal device to transmit the assistance information to the at least one second terminal device.

Optionally, in the first terminal device 300 in this embodiment of the present disclosure, the transmitting module 301 may be specifically configured to transmit the assistance information to the at least one second terminal device within a target transmission time period, where a manner of determining the target transmission time period includes one of the following: being indicated by the second trigger signaling; being stipulated in a protocol; being configured by a control node; and being preconfigured.

Optionally, in the first terminal device 300 in this embodiment of the present disclosure, the second trigger signaling is transmitted by the at least one second terminal device in a case that at least one of the following conditions is met: at least one of a negative acknowledgement NACK message and a discontinuous transmission DTX is continuously detected; before a transport block TB whose priority is higher than a priority threshold or whose quality of service QoS is higher than a QoS threshold is transmitted; and a first measurement value between the at least one second terminal device and the first terminal device is less than a first measurement threshold, where the first measurement value includes at least one of a reference signal received power RSRP measurement value and a distance measurement value.

Optionally, in the first terminal device 300 in this embodiment of the present disclosure, the second trigger signaling is transmitted by the at least one second terminal device at a preset time interval, and the preset time interval is less than a time interval threshold.

Optionally, in the first terminal device 300 in this embodiment of the present disclosure, the preset trigger condition includes at least one of the following: a second measurement value between the first terminal device and each of the at least one second terminal device is less than a second measurement threshold, where the second measurement value includes at least one of an RSRP measurement value and a distance measurement value; the first terminal device has at least one radio resource control RRC connection based on a PC5 interface; the number of occupied resources, the number of to-be-occupied resources, or the number of reserved resources is greater than a resource number threshold; a conflict is detected in hybrid automatic repeat request HARQ feedback; and a resource collision is detected in physical sidelink shared channel PSSCH transmission.

Optionally, in the first terminal device 300 in this embodiment of the present disclosure, the transmitting module 301 may be specifically configured to: under the condition that the preset trigger condition is met, semi-persistently or periodically transmit the assistance information to the at least one second terminal device.

Optionally, in the first terminal device 300 in this embodiment of the present disclosure, the assistance information includes at least one of the following: a resource set indication, a resource reselection indication, a demodulation reference signal DMRS pattern indication, a DMRS port number indication, a DMRS port index indication, a transmit power indication, a modulation and coding scheme MCS indication, a HARQ feedback activation indication, and a HARQ feedback type indication.

Optionally, in the first terminal device 300 in this embodiment of the present disclosure, in a case that the assistance information includes the resource set indication, the resource set indication includes at least one of a time domain resource indication and a frequency domain resource indication, where the time domain resource indication is used to indicate at least one of a period, an offset, a length, a granularity, and a resource indication mode of a time domain resource in a resource set, and the frequency domain resource indication is used to indicate at least one of an offset, a length, a granularity, and a resource indication mode of a frequency domain resource in a resource set.

Optionally, in the first terminal device 300 in this embodiment of the present disclosure, in a case that the assistance information includes the resource set indication and a resource set is divided into a plurality of resource subsets, the resource set indication includes a resource subset indication, where the resource subset indication is used to indicate at least one of a time domain granularity, a frequency domain granularity, a time domain starting position, a frequency domain starting position, a time domain length, a frequency domain length, a time domain period, a frequency domain period, and a resource subset indication mode that correspond to the resource subsets.

Optionally, in the first terminal device 300 in this embodiment of the present disclosure, the transmitting module 301 may be specifically configured to transmit the assistance information to the at least one second terminal device by using first signaling.

Optionally, in the first terminal device 300 in this embodiment of the present disclosure, the first signaling is further used to carry at least one of the following: a resource set indication mode in a case that the assistance information includes the resource set indication; a signaling identifier used to indicate that the first signaling is used to transmit the assistance information; an identifier of the first terminal device; and an identifier of the at least one second terminal device.

Optionally, the first terminal device 300 in this embodiment of the present disclosure may further include a sending module, configured to transmit second signaling to the at least one second terminal device, where the second signaling is used to indicate an effective time period of the assistance information.

Optionally, in the first terminal device 300 in this embodiment of the present disclosure, the effective time period of the assistance information includes one of the following: a first number of time units starting from a first moment, where the first moment is a moment when a target transmit terminal device receives the assistance information; and a second number of time units starting from a second moment, where the second moment is a moment that has an interval of a third number of time units from the moment when the target transmit terminal device receives the assistance information.

It can be understood that the first terminal device 300 provided in this embodiment of the present disclosure is capable of implementing the foregoing information transmission method performed by the first terminal device 300, and the related descriptions of the information transmission method are all applicable to the first terminal device 300. Details are not described herein again.

In this embodiment of the present disclosure, when sidelink transmission is performed between the first terminal device and each of the at least one second terminal device, the assistance information that can be used by each second terminal device to perform sidelink transmission may be transmitted to the at least one second terminal device when the periodic reporting condition or the preset trigger condition is met, to improve reliability of sidelink transmission.

Figure 9:
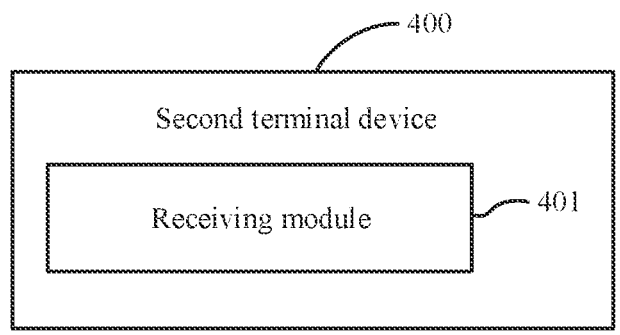
FIG. 9 is a schematic structural diagram of a second terminal device according to an embodiment of the present disclosure.

As shown in FIG. 9, an embodiment of the present disclosure provides a second terminal device 400. The second terminal device 400 includes a receiving module 401, configured to receive assistance information, where the assistance information is transmitted by a first terminal device in a case that a periodic reporting condition or a preset trigger condition is met, and the assistance information is used for sidelink transmission.

Optionally, the second terminal device 400 in this embodiment of the present disclosure may further include a sending module, configured to transmit trigger signaling to the first terminal device, where the trigger signaling is used to indicate the first terminal device to transmit the assistance information to the second terminal device.

Optionally, in the second terminal device 400 in this embodiment of the present disclosure, the sending module may be specifically configured to transmit the trigger signaling to the first terminal device in a case that at least one of the following conditions is met: at least one of a negative acknowledgement NACK message and a discontinuous transmission DTX is continuously detected; before a transport block TB whose priority is higher than a priority threshold or whose quality of service QoS is higher than a QoS threshold is transmitted; and a first measurement value between the second terminal device and the first terminal device is less than a first measurement threshold, where the first measurement value includes at least one of a reference signal received power RSRP measurement value and a distance measurement value.

Optionally, in the second terminal device 400 in this embodiment of the present disclosure, the sending module may be specifically configured to transmit the trigger signaling to the first terminal device at a preset time interval, where the preset time interval is less than a time interval threshold.

Optionally, in the second terminal device 400 in this embodiment of the present disclosure, the assistance information includes at least one of the following: a resource set indication, a resource reselection indication, a demodulation reference signal DMRS pattern indication, a DMRS port number indication, a DMRS port index indication, a transmit power indication, a modulation and coding scheme MCS indication, a HARQ feedback activation indication, and a HARQ feedback type indication.

Optionally, in the second terminal device 400 in this embodiment of the present disclosure, in a case that the assistance information includes the resource set indication, the resource set indication includes at least one of a time domain resource indication and a frequency domain resource indication, where the time domain resource indication is used to indicate at least one of a period, an offset, a length, a granularity, and a resource indication mode of a time domain resource in a resource set, and the frequency domain resource indication is used to indicate at least one of an offset, a length, a granularity, and a resource indication mode of a frequency domain resource in a resource set.

Optionally, in the second terminal device 400 in this embodiment of the present disclosure, in a case that the assistance information includes the resource set indication and a resource set is divided into a plurality of resource subsets, the resource set indication includes a resource subset indication, where the resource subset indication is used to indicate at least one of a time domain granularity, a frequency domain granularity, a time domain starting position, a frequency domain starting position, a time domain length, a frequency domain length, a time domain period, a frequency domain period, and a resource subset indication mode that correspond to the resource subsets.

Optionally, in the second terminal device 400 in this embodiment of the present disclosure, the receiving module 401 may be specifically configured to receive first signaling, where the first signaling carries the assistance information.

Optionally, in the second terminal device 400 in this embodiment of the present disclosure, the first signaling further carries at least one of the following: a resource set indication mode in a case that the assistance information includes the resource set indication; a signaling identifier used to indicate that the first signaling is used to transmit the assistance information; an identifier of the first terminal device; and an identifier of the second terminal device.

Optionally, in the second terminal device 400 in this embodiment of the present disclosure, the receiving module 401 may be further configured to receive second signaling from the first terminal device, where the second signaling is used to indicate an effective time period of the assistance information.

Optionally, in the second terminal device 400 in this embodiment of the present disclosure, a manner of determining the effective time period of the assistance information includes: being preconfigured, being stipulated in a protocol, or being configured by a control node.

Optionally, in the second terminal device 400 in this embodiment of the present disclosure, the effective time period of the assistance information includes one of the following: a first number of time units starting from a first moment, where the first moment is a moment when a target transmit terminal device receives the assistance information; and a second number of time units starting from a second moment, where the second moment is a moment that has an interval of a third number of time units from the moment when the target transmit terminal device receives the assistance information.

It can be understood that the second terminal device 400 provided in this embodiment of the present disclosure is capable of implementing the foregoing information transmission method performed by the second terminal device 400, and the related descriptions of the information transmission method are all applicable to the second terminal device 400. Details are not described herein again.

In this embodiment of the present disclosure, when the second terminal device performs sidelink transmission with the first terminal device, sidelink transmission may be implemented based on the assistance information transmitted by the first terminal device in a case that the periodic reporting condition or the preset trigger condition is met, to improve reliability of sidelink transmission.

Figure 10:
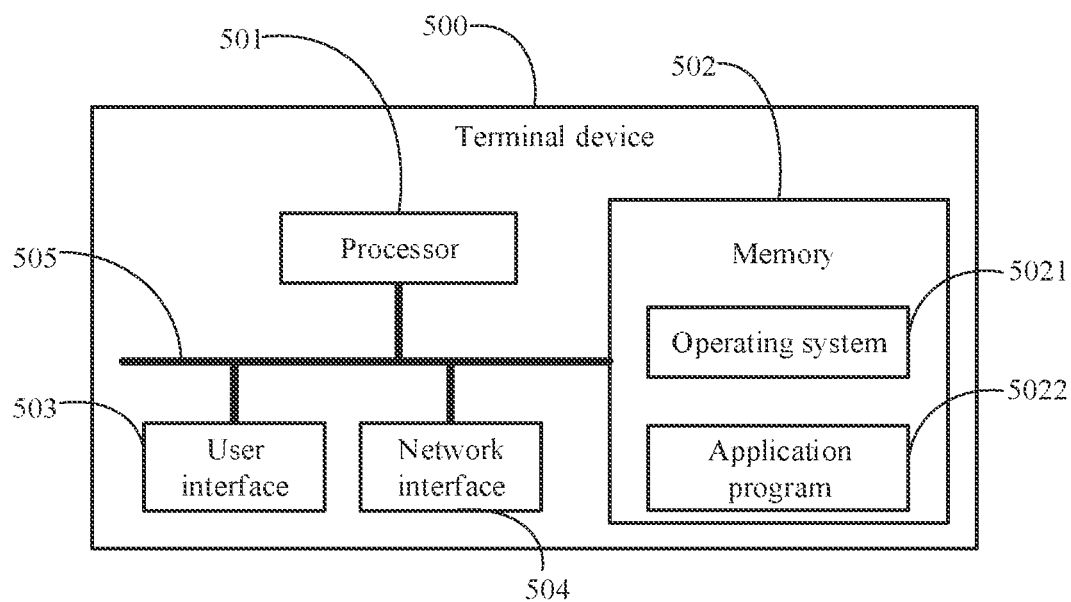
FIG. 10 is a schematic structural diagram of a terminal device according to an embodiment of the present disclosure.

FIG. 10 is a block diagram of a terminal device according to another embodiment of the present disclosure. The terminal device 500 shown in FIG. 10 includes at least one processor 501, a memory 502, at least one network interface 504, and a user interface 503. The components of the terminal device 500 are coupled together by using a bus system 505. It can be understood that the bus system 505 is configured to implement connection and communication between these components. The bus system 505 may include not only a data bus but also a power supply bus, a control bus, and a status signal bus. However, for clarity of description, various buses are marked as the bus system 505 in FIG. 10.

The user interface 503 may include a display, a keyboard, a pointing device (for example, a mouse or a trackball), a touch panel, a touchscreen, or the like.

It can be understood that the memory 502 in this embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DRRAM). The memory 502 in the system and method described in the embodiments of the present disclosure is intended to include but is not limited to these and any other suitable types of memories.

In some implementations, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser which are used to implement various application services. A program for implementing the method in this embodiment of the present disclosure may be included in the application program 5022.

In this embodiment of the present disclosure, the terminal device 500 further includes a computer program stored in the memory 502 and capable of running on the processor 501.

Optionally, when the computer program is executed by the processor 501, the following step may be implemented:
transmitting assistance information to at least one second terminal device if a periodic reporting condition or a preset trigger condition is met, where the assistance information is used for the at least one second terminal device to perform sidelink transmission.

In this embodiment of the present disclosure, when sidelink transmission is performed between a first terminal device and each of the at least one second terminal device, the assistance information that can be used by each second terminal device to perform sidelink transmission may be transmitted to the at least one second terminal device when the periodic reporting condition or the preset trigger condition is met, to improve reliability of sidelink transmission.

Optionally, when the computer program is executed by the processor 501, the following step may be alternatively implemented:
receiving assistance information, where the assistance information is transmitted by a first terminal device in a case that a periodic reporting condition or a preset trigger condition is met, and the assistance information is used for sidelink transmission.

In this embodiment of the present disclosure, when a second terminal device performs sidelink transmission with the first terminal device, sidelink transmission may be implemented based on the assistance information transmitted by the first terminal device in a case that the periodic reporting condition or the preset trigger condition is met, to improve reliability of sidelink transmission.

The method disclosed in the foregoing embodiments of the present disclosure may be applied to the processor 501 or implemented by the processor 501. The processor 501 may be an integrated circuit chip with a signal processing capability. During implementation, the steps of the foregoing method may be completed by hardware integrated logic circuits in the processor 501 or instructions in the form of software. The processor 501 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present disclosure. The general-purpose processor may be a microprocessor, or the processor may also be any conventional processor or the like. Steps of the methods disclosed with reference to the embodiments of the present disclosure may be directly performed and completed by using a hardware decoding processor, or may be performed and completed by using a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 502, and the processor 501 fetches information in the memory 502, and completes the steps of the foregoing method in combination with its hardware. Specifically, the computer-readable storage medium stores a computer program, where when the computer program is executed by the processor 501, the steps of the information transmission method embodiment are implemented.

It can be understood that the embodiments described in the embodiments of the present disclosure may be implemented by hardware, software, firmware, middleware, microcode, or a combination thereof. For hardware implementation, a processing unit may be implemented in one or more application specific integrated circuits (ASIC), a digital signal processor (DSP), a digital signal processing device (DSPD), a programmable logic device (PLD), a field programmable gate array (FPGA), a general-purpose processor, a controller, a microcontroller, a microprocessor, another electronic unit for executing the functions described in the present disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

The terminal device 500 is capable of implementing the processes implemented by the terminal device in the foregoing embodiments. To avoid repetition, details are not described herein again.

Optionally, an embodiment of the present disclosure further provides a first terminal device, including a processor, a memory, and a computer program stored in the memory and capable of running on the processor. When the computer program is executed by the processor, the processes of the information transmission method embodiment corresponding to FIG. 1 are implemented, with the same technical effects achieved. To avoid repetition, details are not described herein again.

An embodiment of the present disclosure further provides a computer-readable storage medium, where the computer-readable storage medium stores a computer program. When the computer program is executed by a processor, the processes of the information transmission method embodiment corresponding to FIG. 1 are implemented, with the same technical effects achieved. To avoid repetition, details are not described herein again. For example, the computer-readable storage medium is a read-only memory (ROM), a random access memory (RAM), a magnetic disk, or an optical disc.

Optionally, an embodiment of the present disclosure further provides a second terminal device, including a processor, a memory, and a computer program stored in the memory and capable of running on the processor. When the computer program is executed by the processor, the processes of the information transmission method embodiment corresponding to FIG. 7 are implemented, with the same technical effects achieved. To avoid repetition, details are not described herein again.

An embodiment of the present disclosure further provides a computer-readable storage medium, where the computer-readable storage medium stores a computer program. When the computer program is executed by a processor, the processes of the information transmission method embodiment corresponding to FIG. 7 are implemented, with the same technical effects achieved. To avoid repetition, details are not described herein again. For example, the computer-readable storage medium is a read-only memory (ROM), a random access memory (RAM), a magnetic disk, or an optical disc.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing embodiments are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. An information transmission method, performed by a first terminal device, wherein the method comprises:
   transmitting assistance information to at least one second terminal device in a case that a preset trigger condition is met, wherein the assistance information is used for the at least one second terminal device to perform sidelink transmission;
   in a case that the assistance information comprises a resource set indication, before the transmitting assistance information to at least one second terminal device in a case that a preset trigger condition is met, the method further comprises:
   in a case that second trigger signaling transmitted by the at least one second terminal device is received, determining that the preset trigger condition is met, wherein the second trigger signaling is used to indicate the first terminal device to transmit the assistance information to the at least one second terminal device.

2. The method according to claim 1, wherein the transmitting assistance information to at least one second terminal device comprises:
   transmitting the assistance information to the at least one second terminal device within a target transmission time period, wherein a manner of determining the target transmission time period comprises one of the following:
   being indicated by the second trigger signaling;
   being stipulated in a protocol;
   being configured by a control node; and
   being preconfigured.

3. The method according to claim 1, wherein the second trigger signaling is transmitted by the at least one second terminal device in a case that at least one of the following conditions is met:
   at least one of a negative acknowledgement (NACK) message and a discontinuous transmission (DTX) is continuously detected;
   before a transport block TB whose priority is higher than a priority threshold or whose quality of service (QOS) is higher than a QoS threshold is transmitted; and
   a first measurement value between the at least one second terminal device and the first terminal device is less than a first measurement threshold, wherein the first measurement value comprises at least one of a reference signal received power (RSRP) measurement value and a distance measurement value.

4. The method according to claim 1, wherein the second trigger signaling is transmitted by the at least one second terminal device at a preset time interval, and the preset time interval is less than a time interval threshold.

5. The method according to claim 1, wherein the preset trigger condition comprises at least one of the following:
   a second measurement value between the first terminal device and each of the at least one second terminal device is less than a second measurement threshold, wherein the second measurement value comprises at least one of an RSRP measurement value and a distance measurement value;
   the first terminal device has at least one radio resource control (RRC) connection based on a PC5 interface;
   the number of occupied resources, the number of to-be-occupied resources, or the number of reserved resources is greater than a resource number threshold.

6. The method according to claim 1, wherein the transmitting assistance information to at least one second terminal device in a case that a preset trigger condition is met comprises:

in a case that the preset trigger condition is met, semi-persistently or aperiodically transmitting the assistance information to the at least one second terminal device.

7. The method according to claim 1, wherein the assistance information comprises at least one of the following: a resource reselection indication, a demodulation reference signal (DMRS) pattern indication, a DMRS port number indication, a DMRS port index indication, a transmit power indication, a modulation and coding scheme (MCS) indication, a HARQ feedback activation indication, and a HARQ feedback type indication.

8. The method according to claim 7, wherein in a case that the assistance information comprises the resource set indication, the resource set indication comprises at least one of a time domain resource indication and a frequency domain resource indication, wherein
the time domain resource indication is used to indicate at least one of a period, an offset, a length, a granularity, and a resource indication mode of a time domain resource in a resource set, and the frequency domain resource indication is used to indicate at least one of an offset, a length, a granularity, and a resource indication mode of a frequency domain resource in a resource set.

9. The method according to claim 7, wherein in a case that the assistance information comprises the resource set indication and a resource set is divided into a plurality of resource subsets, the resource set indication comprises a resource subset indication, wherein
the resource subset indication is used to indicate at least one of a time domain granularity, a frequency domain granularity, a time domain starting position, a frequency domain starting position, a time domain length, a frequency domain length, a time domain period, a frequency domain period, and a resource subset indication mode that correspond to the resource subsets.

10. The method according to claim 7, wherein the transmitting assistance information to at least one second terminal device comprises:
transmitting the assistance information to the at least one second terminal device by using first signaling.

11. The method according to claim 10, wherein the first signaling is further used to carry at least one of the following:
a resource set indication mode in a case that the assistance information comprises the resource set indication;
a signaling identifier used to indicate that the first signaling is used to transmit the assistance information;
an identifier of the first terminal device; and
an identifier of the at least one second terminal device.

12. The method according to claim 7, wherein the method further comprises:
transmitting second signaling to the at least one second terminal device, wherein the second signaling is used to indicate an effective time period of the assistance information.

13. The method according to claim 12, wherein the effective time period of the assistance information comprises one of the following:
a first number of time units starting from a first moment, wherein the first moment is a moment when a target transmit terminal device receives the assistance information; and
a second number of time units starting from a second moment, wherein the second moment is a moment that has an interval of a third number of time units from the moment when the target transmit terminal device receives the assistance information.

14. A terminal device, comprising a memory, a processor, and a computer program stored in the memory and capable of running on the processor, wherein the computer program is executed by the processor to implement:
transmitting assistance information to at least one second terminal device in a case that a preset trigger condition is met, wherein the assistance information is used for the at least one second terminal device to perform sidelink transmission;
in a case that the assistance information comprises a resource set indication, before the transmitting assistance information to at least one second terminal device in a case that a preset trigger condition is met, the computer program is further executed by the processor to implement:
in a case that second trigger signaling transmitted by the at least one second terminal device is received, determining that the preset trigger condition is met, wherein the second trigger signaling is used to indicate the first terminal device to transmit the assistance information to the at least one second terminal device.

15. A terminal device, comprising a memory, a processor, and a computer program stored in the memory and capable of running on the processor, wherein the computer program is executed by the processor to implement:
receiving assistance information, wherein the assistance information is transmitted by a first terminal device in a case that a preset trigger condition is met, and the assistance information is used to perform sidelink transmission;
in a case that the assistance information comprises a resource set indication, wherein before the receiving assistance information, the computer program is further executed by the processor to implement:
transmitting trigger signaling to the first terminal device, wherein the trigger signaling is used to indicate the first terminal device to transmit the assistance information to the second terminal device.

16. The method according to claim 2, wherein being configured by the control node comprises: being configured by the control node through PC5-radio resource control (RRC).

17. The terminal device according to claim 14, wherein the transmitting assistance information to at least one second terminal device comprises:
transmitting the assistance information to the at least one second terminal device within a target transmission time period, wherein a manner of determining the target transmission time period comprises one of the following:
being indicated by the second trigger signaling;
being stipulated in a protocol;
being configured by a control node; and
being preconfigured.

18. The terminal device according to claim 14, wherein the second trigger signaling is transmitted by the at least one second terminal device in a case that at least one of the following conditions is met:
at least one of a negative acknowledgement (NACK) message and a discontinuous transmission (DTX) is continuously detected;
before a transport block TB whose priority is higher than a priority threshold or whose quality of service (QOS) is higher than a QoS threshold is transmitted; and
a first measurement value between the at least one second terminal device and the first terminal device is less than a first measurement threshold, wherein the first measurement value comprises at least one of a reference signal received power (RSRP) measurement value and a distance measurement value.

19. The terminal device according to claim 14, wherein the second trigger signaling is transmitted by the at least one second terminal device at a preset time interval, and the preset time interval is less than a time interval threshold.

20. The terminal device according to claim 14, wherein the preset trigger condition comprises at least one of the following:
- a second measurement value between the first terminal device and each of the at least one second terminal device is less than a second measurement threshold, wherein the second measurement value comprises at least one of an RSRP measurement value and a distance measurement value;
- the first terminal device has at least one radio resource control (RRC) connection based on a PC5 interface;
- the number of occupied resources, the number of to-be-occupied resources, or the number of reserved resources is greater than a resource number threshold.

* * * * *